Jan. 8, 1963

H. S. KOLB 3,071,784

BEE OBSERVATION DEVICE

Filed July 3, 1959

INVENTOR.
HERMAN S. KOLB

BY

*Jerry J Dunlap*

ATTORNEY

Jan. 8, 1963    H. S. KOLB    3,071,784
BEE OBSERVATION DEVICE

Filed July 3, 1959    3 Sheets-Sheet 2

INVENTOR.
HERMAN S. KOLB
BY
ATTORNEY

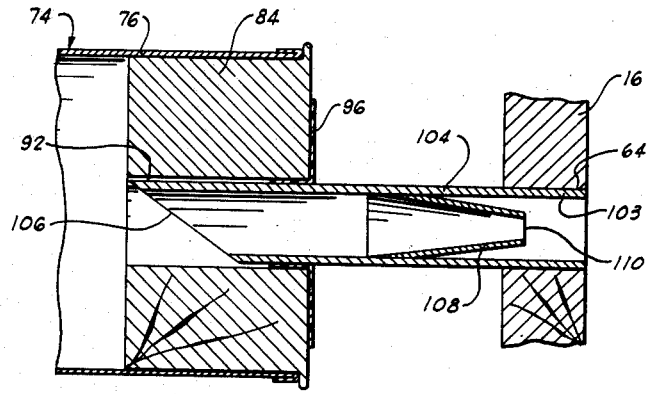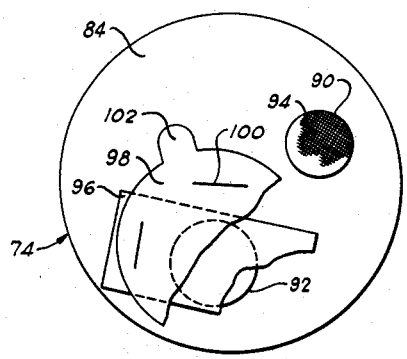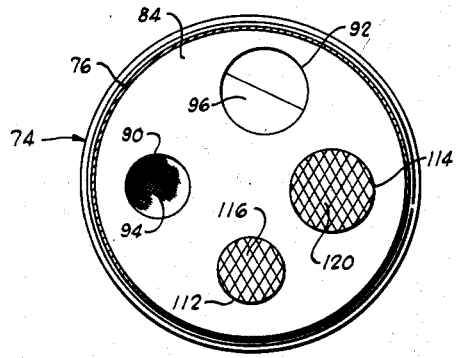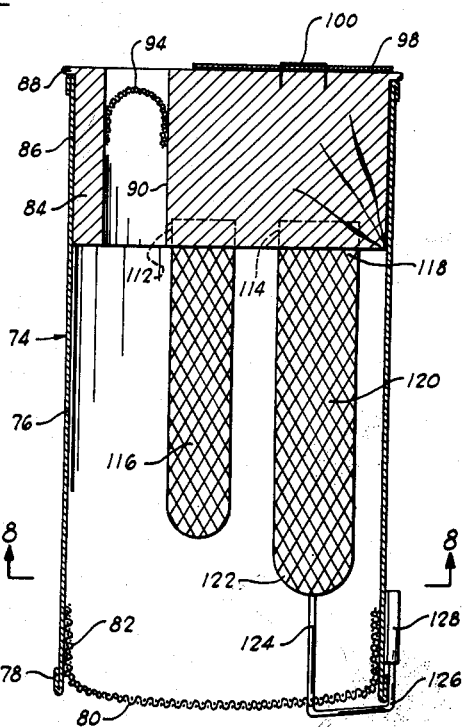

United States Patent Office 3,071,784
Patented Jan. 8, 1963

3,071,784
BEE OBSERVATION DEVICE
Herman S. Kolb, 737 W. Main, Edmond, Okla.
Filed July 3, 1959, Ser. No. 824,887
2 Claims. (Cl. 6—9)

This invention relates generally to improvements in the art of handling bees, and more particularly, but not by way of limitation, to an improved device for observing the working and living habits of bees.

As it is well known in the art, the working and living habits of bees makes both an interesting and educational study. At the present time, such stiudies are ordinarily conducted first-hand only by those having special instructions in the handling of bees, and the only studies of this kind made by children and the general public are through the reading of reports made by technicians in the field. In other words, school children and the public in general have no practical and economical means for the first-hand observation of the various activities of bees. Several prior workers in the field have devised various types of bee observation devices, but none of these devices have been widely accepted or used, principally due to their complexity of operation and high cost.

The present invention contemplates a novel bee observation device which is small in size and may be easily accommodated in a classroom or similar location, and yet will permit the observation of a hive of bees of sufficient size for practical sutdy. Broadly stated, the present invention may be defined as a bee observation device for a queen bee and her workers, comprising a base, end walls secured to the opposite ends of the base having inner faces and outer faces and extending upwardly from the base, a cross member secured between the central portions of the upper ends of the end walls, each of said end walls having a vertical groove in the inner face thereof adjacent each side of the cross member, each of said grooves extending throughout the length of the respective end wall, a transparent panel on each side of the cross member having a width sufficient to extend the side edges of the panel into the mating grooves in the end walls, each of said panels having a thickness to provide a sliding fit thereof in the respective grooves and a height to extend from the cross member to the base and form a bee living chamber with the end walls and the cross member and the base, each of said end walls having an aperture therethrough communicating with the lower portion of the bee living chamber, a feeding trough extending through one of said apertures and being open along its top within said chamber, a liquid absorbent material in said trough, the outer end of said trough projecting outwardly of the respective end wall, means for feeding a liquid bee food into the outer end of said trough, a worker bee entrance and exit tube extending into the other aperture, and a honeycomb foundation secured between the end walls in the upper portion of said chamber upon which the worker bees may build a honeycomb.

This invention also contemplates a novel shipping container for a queen and a group of worker bees which has divided compartments for the bees to prevent the workers from attacking the queen and is constructed to safely transport the bees.

An important object of this invention is to provide a bee observation device wherein the worker bees are always provided with sufficient food, regardless of the outside weather conditions, and the food supply is easily replenished without the likelihood of the bees being turned loose in a classroom or the like. Also, it is an object of this invention to provide a simple feeding device in which the bees will not be drowned.

A further object of this invention is to provide a novel bee observation device which is easily cleaned and yet which provides the maximum safety in the handling of the bees.

Another object of this invention is to minimize the possibility of either loosing the queen bee of a beehive by either the escape of the queen bee or by the queen bee being attacked by the worker bees.

A still further object of this invention is to provide a novel construction for shipping bees from one location to another and for transferring the bees into a bee observation device.

Another object of this invention is to provide a bee observation device which is simple in construction, may be economically manufactured, and which will have a long service life.

Other objects and advantages of the invention will be evident from the following detailed description, when read in conjunction with the accompanying drawings which illustrate my invention.

In the drawings:

FIGURE 6 is an elevational view of one end of the novel shipping container for bees with portions of the container being removed to illustrate details of construction.

FIGURE 7 is a vertical sectional view of the shipping container.

FIGURE 8 is a sectional view as taken substantially along lines 8—8 of FIGURE 7.

FIGURE 9 is a detailed sectional view of the structure used in transferring bees from a shipping container into a bee observation device.

Figure 1:
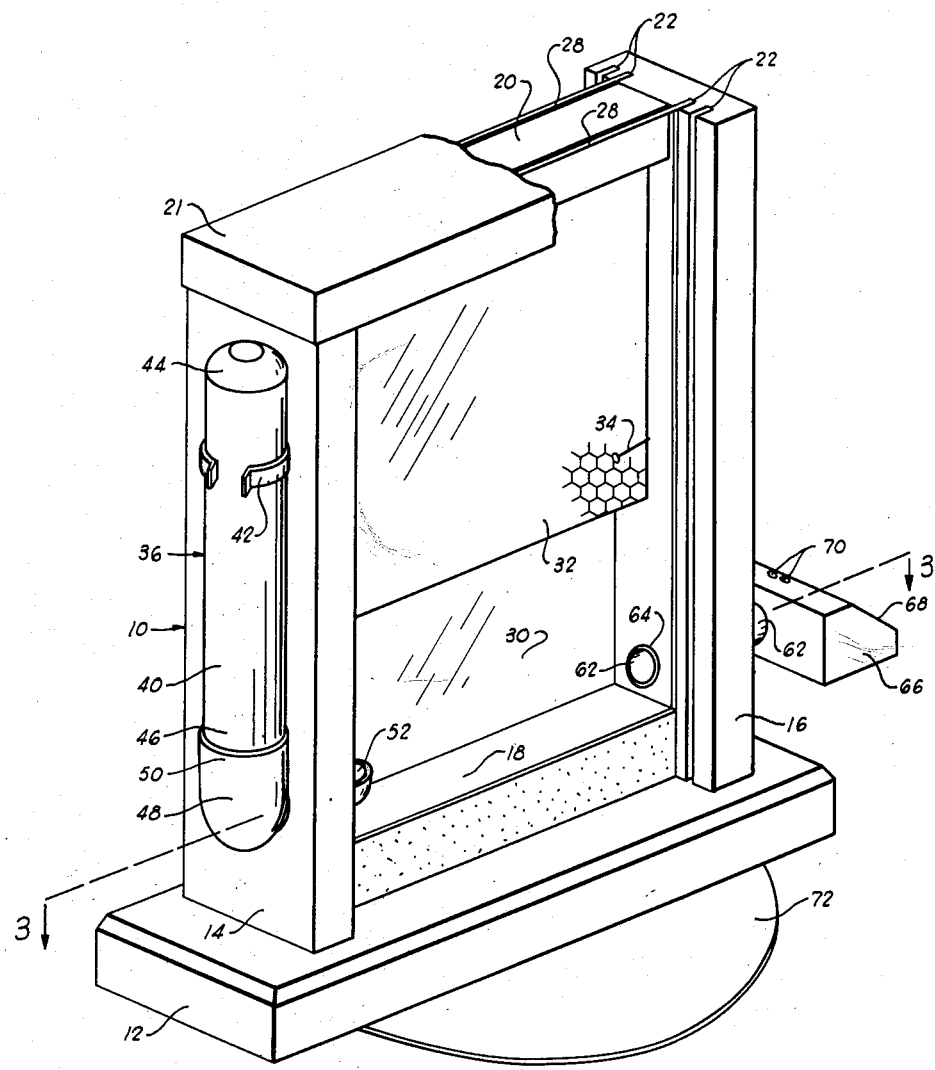
FIGURE 1 is a perspective view of a bee observation device constructed in accordance with this invention, with a portion of the structure being partially removed to more clearly illustrate the device.
Figure 2:
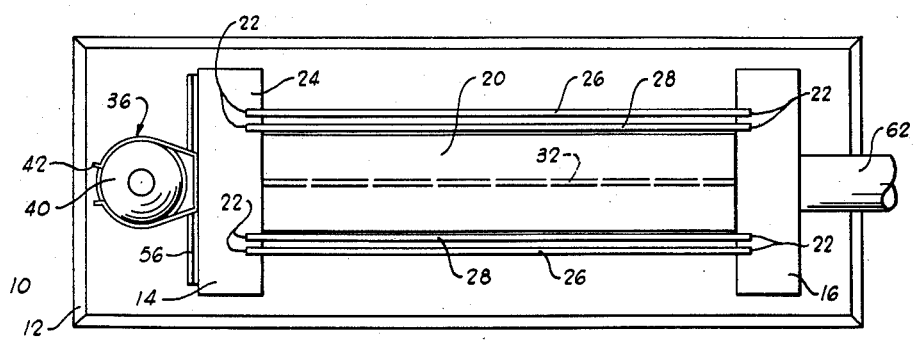
FIGURE 2 is a plan view of the device shown in FIG. 1 with the cap which is normally over the top of the device being removed.

Referring to the drawings in detail, and particularly FIG. 1, reference character 10 generally designates a bee observation device constructed in accordance with this invention and which has a rectangularly-shaped base member 12 supporting vertically extending end walls 14 and 16 on the opposite end portions thereof. The members 12, 14 and 16 are preferably constructed out of wood and are suitably secured together in the positions illustrated in FIG. 1 by any suitable connecting devices (not shown). A portion of the support for the end walls 14 and 16 is in the form of horizontally extending cross members 18 and 20 connected between the lower and upper ends, respectively, of the walls 14 and 16. As shown most clearly in FIG. 2, the members 18 and 20 are narrow compared with the width of the walls 14 and 16, and each of the members 18 and 20 is extended between the central portions of the walls 14 and 16. A suitable cap 21 normally extends over the upper ends of the walls 14 and 16, but is easily removed for cleaning of the device, as will be described.

Figure 3A:
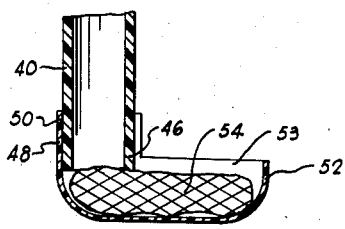
FIGURE 3A is a sectional view through the lower end of the feeding mechanism as taken along lines 3A—3A of FIG. 3.
Figure 3:
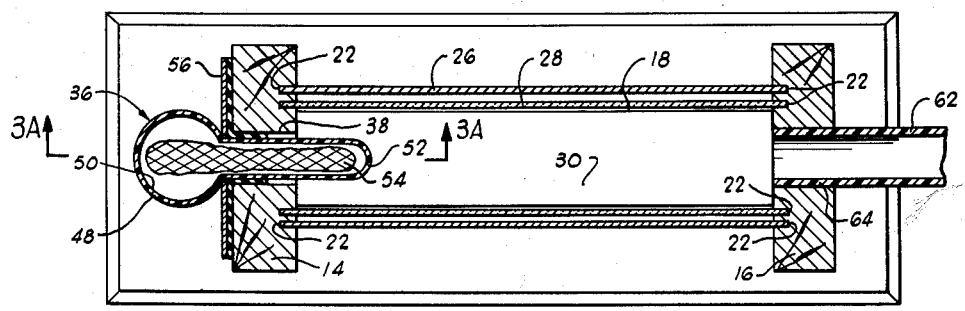
FIGURE 3 is a horizontal sectional view through the device as taken substantially along lines 3—3 of FIG. 1.

A pair of grooves 22 are formed in the inner face 24 of each of the end walls 14 and 16 at each side of the member 20. Each groove 22 extends vertically throughout the length of the respective end wall 14 or 16 and is of a size to slidingly receive the side edge portion of either one of a pair of panels 26 or 28. As indicated in FIG. 3, the panels 28 are formed out of a transparent material, such as glass, and one of the panels 28 is preferably supported in the mating grooves 22 of the end walls 14 and 16 adjacent each side of the cross members 18 and 20 to form a bee living and working chamber 30 in the central portion of the device 10 extending horizontally between the end walls 14 and 16 and vertically between the cross members 18 and 20. It will be understood that the mating grooves 22 in the walls 14 and 16 are arranged in aligned relation to slidingly receive the opposite edge portions of the panels 28 when the panels 28 are inserted in mating grooves 22 as illustrated in FIG. 3. In the positions of the panels 28 as illustrated in FIG. 3, insufficient clearance is provided around either of the panels 28 for the escape of bees from the chamber 30 into the room in which the device 10 is supported, and yet the panels 28 may be easily removed from the top of the device 10 for cleaning or replacement.

Two of the panels 26 are also preferably provided for each device 10, and each panel 26 may be slidingly secured in the outermost mating grooves 22 outwardly of the panels 28. Each panel 26 is constructed out of an opaque material, such as sheet metal, and when the panels 26 are in the positions shown in FIG. 3, the entrance of light into the chamber 30 is reduced to a minimum, such that the panels 26 may be used to prevent the sun from shining into the chamber 30 and increasing the temperature in the chamber 30 to an excessive level. Additional insulation (not shown) may also be placed between adjacent panels 26 and 28 if desired. Also, each opaque panel 26 may be inserted in its respective mating grooves 22 adjacent one of the panels 28 when it is desired to remove the respective panel 28 for cleaning or repair. In this latter connection it should be noted that each adjacent pair of grooves 22 in each of the end walls 14 and 16 are arranged in close proximity to minimize the clearance around the upper cross member 20 when the transparent panels 28 are removed for cleaning, such that bees in the chamber 30 will not escape upwardly around the sides of the cross member 20. If desired, however, the inner grooves 22 may be made of sufficient width to accommodate both of the panels 26 and 28, such that the panels 26 may be positioned closer to the cross members 18 and 20 when the panels 28 are removed for cleaning and further minimize the clearance around the upper cross member 20.

As shown in FIG. 1, a comb foundation 32 is positioned in the upper portion of the chamber 30 between the end walls 14 and 16 upon which the worker bees may form a honeycomb. The comb foundation 32 may be of any desired construction, but is preferably in the form of an aluminum sheet coated with a suitable bees wax which the worker bees may use as a starting material for the various cells, as is well known in the art. The foundation 32 is secured to the end walls 14 and 16 and to the upper cross member 20 in any suitable manner, such as by the use of nails 34 to retain the foundation 32 substantially vertical in the upper portion of the chamber 30 between the transparent panels 28.

A feeding mechanism, generally designated by reference character 36, is supported on the end wall 14 and extends through an aperture 38 in the lower portion of the end wall 14 slightly above the lower cross member 18 as illustrated in FIG. 3. The feeding mechanism 36 comprises a tube 40 of any suitable material, such as glass or plastic, which is held in a vertical position along the outer face of the wall 14 by suitable clips 42 to facilitate the easy removal and replacement of the tube 40. The upper end 44 of the tube 40 is preferably closed and the lower end 46 of the tube 40 extends into a trough member 48, with the trough member 48 in turn extending through the aperture 38 into the lower portion of the chamber 30. The outer end portion 50 of the trough member 48 is in the form of a socket to tightly receive the lower end 46 of the tube 40, and the inner end portion 52 of the trough member 48 is preferably open along its top 53 to expose the interior of the trough member 48 to bees in the chamber 30. As illustrated in FIG. 3, cotton or other suitable liquid absorbent material 54 is wound into substantially cylindrical form and is pressed tightly into the trough member 48 to extend from the socket portion 50 into the inner end portion 52 of the trough member. As shown in FIG. 3A, the lower end of the tube 40 is extended below the upper edge 53 of the trough portion 52, in order that the tube 40 may be filled with a suitable liquid bee food, such as sugar water, and the liquid food will be retained at a level in the trough portion 52 only slightly above the lower end of the tube 40 (in the nature of a chicken watering device) for consumption by bees in the chamber 30. The major portion of the liquid food in the trough portion 52 will be absorbed by the material 54, whereby bees may stand along the edges 53 of the portion 52 of the trough member 48 and feed on the food absorbed in the material 54 without fear of the bees drowning in the event they fall into the trough.

Figure 4:
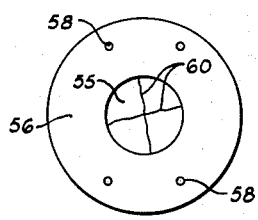
FIGURE 4 is a detailed view of the opening through one side of the device which is used to accommodate the feeding mechanism.

As will be apparent, it is periodically necessary to remove the feeding mechanism 36 from the device and to replenish the supply of food in the tube 40. I therefore provide a cover 55 over the aperture 38 as illustrated in FIGS. 3 and 4. The cover 55 is in the form of an elastic material, such as rubber, suitably secured on the outer face of the end wall 14 over the aperture 38 by a ring 56 and suitable fasteners 58, such as nails. The central portion of the cover 55 opposite the aperture 38 is provided with slots 60, such that the end portion 52 of the feeding mechanism trough member 48 may be easily inserted through the cover member 55 and the aperture 38 into the chamber 30. However, when the feeding mechanism 36 is removed, the material forming the cover 55 adjacent the slots 60 will spring together to effectively close the aperture 38 against the escape of bees from the chamber 30. Therefore, the person replenishing the supply of food in the feeding mechanism 36 merely removes the feeding mechanism 36 by springing open the clips 42 and sliding the trough member 48 out of the aperture 38, and then replaces the feeding mechanism 36 by reverse movements, with no fear of bees escaping through the aperture 38.

Figure 5:
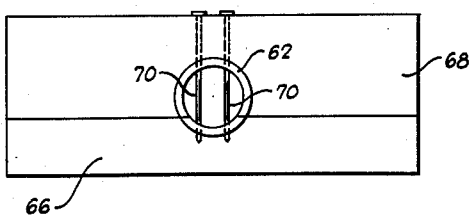
FIGURE 5 is an end elevational view of the tube through which the worker bees move in and out of the device, along with the ramp upon which the bees light when approaching the observation device.

A bee entrance and exit tube 62 is suitably secured in an aperture 64 extending through the lower portion of the end wall 16 adjacent the lower cross member 18 as illustrated in FIGS. 1 and 3. The tube 62 is preferably formed out of a material which may be bent, such as a plastic material, and is preferably of a size to fit tightly in the aperture 64 without the necessity of using fastening devices. Also, the tube 62 is of a diameter that the worker bees may turn around therein. The tube 62 extends outwardly from the device 10 and has a suitable ramp 66 on the outer end thereof to facilitate the ease with which the bees may enter the tube 62. As shown in FIGS. 1 and 5, a portion 68 of the ramp 66 is tapered to provide a landing area for the bees when the ramp 66 is supported in the position illustrated in FIGS. 1 and 5. In this latter connection it should be noted that the ramp 66 is ordinarily positioned outside when the device 10 is positioned inside of a room or the like, and the tube 62 may be of any desired length to extend from the end wall 16 to the desired position of the ramp 66, such that the worker bees are free to enter and leave the chamber 30 for gathering food from conventional food sources. However, the outer end portion of the tube 62 is preferably restricted, as by use of a pair of nails 70, as shown in FIG. 5, such that an insufficient opening is provided through the tube 62 for the escape of the queen bee from the chamber 30. The nails 70 may be easily driven through the ramp member 66 and through the outer end portion of the tube 62 in the desired positions, and preferably about 0.164 inch apart, to provide spacing for free movement of the worker bees between the nails 70 and yet sufficiently close for restriction of movement of the queen bee.

As previously indicated, the device 10 will normally be positioned in a room in order that the activity of the bees in the chamber 30 may be easily observed, as by a class of school children. It may also be noted that the device 10 will normally be supported adjacent a window in order that the tube 62 may be more easily extended to the outside of the building. However, it is sometimes desirable to support the device 10 outside of a building as a rather permanent beehive. For this latter event, I provide a circular metal plate 72 (as shown in FIG. 1) suitably secured on the lower face of the base member 12 for the convenient mounting of the device 10 on a post or the like in such a manner that animals or rodents will have difficulty in climbing around the plate 72 and gaining access to the device 10.

One of the difficult problems involved in the handling of bees is in shipping the bees from one location to another without damage to the bees, particularly without the worker bees attacking the queen bee, and the easy and convenient transfer of the bees from the shipping container into a beehive or bee observation device. I therefore provide a novel shipping container generally designated by reference character 74 and shown in detail in FIGS. 6, 7 and 8. The container 74 comprises a hollow metal housing 76 open at its opposite ends and preferably being circular in cross section. One end 78 of the housing 76 is closed by means of a suitable screen 80. The screen 80 may be easily secured in the housing 76 by wedging the edge portions 82 of the screen into the open end 78 and stapling (not shown) the edge portions 82 of the screen to the housing 76 to provide an economical construction and provide adequate ventilation for bees in the housing 76.

A cap member 84, preferably formed out of wood, is wedged into the opposite open end 86 of the housing 76 and is provided with a circumferential flange 88 on the upper end thereof to limit the extent the cap may be inserted in the housing 76 as illustrated in FIG. 7. Also, nails (not shown) may be used to secure the cap 84 in the housing 76. Apertures 90 and 92 are formed through the cap member 84. The aperture 90 provides ventilation and may be used for inserting the bees in the housing 76 when the cap member 84 is in place in the housing. A suitable screen 94 is wedged in the outer end portion of the aperture 90 to prevent the escape of the bees. The screen 94 is wedged into the aperture 90 in the same manner as the screen 80 is wedged into the open end 78 of the housing 76.

The other aperture 92 extending through the cap member 84 is utilized to remove bees from the container 74. The aperture 92 is therefore normally closed and for this purpose I provide a strip 96 of any suitable fragile tape, such as plastic or cellophane tape, secured to the upper end of the cap member 84 over the upper end of the aperture 92. In addition, I provide a cover 98 formed of cardboard or the like and suitably secured over the top of the tape 96 in any suitable manner, such as by staples 100. A tab 102 is formed on one side of the cover 98, such that the person desiring to open the container 76 merely grips the tab 102 and pulls the cover 98 from over the tape 96. The staples 100 are easily removed when any appreciable outward force is applied on the cover 98.

In transferring bees from the shipping container 74 into the device 10, the tube 62 is first removed from the aperture 64 in the end wall 16 and the cover 98 is removed from the container 74 by pulling upwardly or outwardly on the tab 102. One end 103 of a novel tube 104 (FIG. 9) is inserted in the aperture 64 and the opposite end 106 of the tube 104 is pushed through the fragile tape 96 and into the aperture 92 of the shipping container cap member 84. The end 106 of the tube 104 is preferably cut at an angle, as illustrated in FIG. 9, to facilitate the forcing of the tube 104 through the tape 96 into the aperture 92. It will also be observed that I secure a conically-shaped baffle member 108 in the central portion of the tube 104, with the smaller end 110 of the member 108 extending toward the end 103 of the tube. Therefore, bees will move from the shipping container 74 through the tube 104 into the chamber 30 of the device 10, but the bees will be discouraged from returning to the container 74 due to the restricted opening through the smaller end 110 of the baffle 108. When the bees in the chamber 30 are counted and it is determined that all of the bees have moved from the container 74 into the chamber 30, the tube 104 may be removed and the tube 62 quickly inserted in the aperture 64; whereupon normal operation of the device 10 is carried on.

As shown in FIGS. 7 and 8, a pair of circular grooves or indentations 112 and 114 are formed in the lower face of the cap member 84 of the shipping container 74 in spaced relation with respect to the apertures 90 and 92. One of the indentations 112 is used to support a cylindrically-shaped roll of absorbent material 116 in which a quantity of liquid bee food may be stored. However, the material 116 may be in the form of any desired bee food to satisfy bees stored in the container 74 during transit. In either event, the upper end of the material 116 may be easily wedged in the respective indentation 112 to secure the material 116 in the container 74.

The indentation 114 is utilized to tightly receive the upper end 118 of a queen bee housing 120 and support the housing 120 in the housing 76. The housing 120 is preferably in the form of a tube of wire mesh like material in which the queen bee may be stored, with the worker bees being stored in the housing 76 outside of the housing 120. The lower end 122 of the housing 120 is closed and the upper end 118 of the housing is open but wedged in the indentation 114 to prevent escape of the queen bee from the housing 120 during shipment of the container 74. A suitable wire 124 is secured to the closed end 122 of the housing 120 and extended through the screen 80 at the adjacent end of the container 74, such that the open end 118 of the housing 120 may be easily removed from the indentation 114 by pulling outwardly on the wire 124; whereupon the queen bee is free to move out of the housing 120. It will be apparent that the open end 118 of the queen bee housing is removed from the indentation 114 only when it is desired to transfer the bees through the aperture 92 into the bee observation device 10. The free end 126 of the wire 124 may be easily secured to the side of the housing 76 by suitable adhesive tape 128 during shipment of the container 74 to minimize the possibility of accidental movement of the housing 120. Thus, the queen bee will be retained in the container 74 separate from the worker bees to prevent the worker bees from harming the queen bee. In this connection it may also be noted that once the bees are transferred to the chamber 30 of the observation device 10 where the worker bees have facilities for building a honeycomb, the worker bees have no tendency to attack the queen bee, such that the queen bee will then be safe.

From the foregoing it will be apparent that the present invention provides a novel bee observation device which may be constructed of relatively small size for convenient location in a classroom or the like. The chamber in which the bees build a honeycomb is exposed on both sides, such that the activities of the bees may be clearly observed. It will also be apparent that the transparent panels in the sides of the bee observation device may be easily removed for cleaning or the like without fear of the bees escaping into the room in which the device is positioned. The present device includes a novel feeding mechanism which will provide a constant and adequate supply of food for the bees without danger of the bees being drowned in the feeding device, and the feeding device may be easily removed and replaced without bees escaping from the observation device. It will further be apparent that the present inventiton provides a novel shipping container for transferring a group of bees from one location to another without damage to the queen bee and without damage to the worker bees, as well as providing an easy and convenient means for transferring bees from the shipping container into a bee observation device or the like. Finally it will be apparent that the present invention provides a bee observation device which is simple in construction, may be economically manufactured and which will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A queen and worker bee shipping and dispensing apparatus, comprising a tubular metal bee shipping housing open at its opposite ends, a screen secured in one end of the housing to provide ventilation for bees in the housing, a wooden cap member secured in the opposite end of the housing and having a bee dispensing aperture therethrough communicating with the interior of the housing, a strip of fragile tape on said cap over said aperture for preventing escape of bees from the housing during shipment, a cardboard cover stapled to said cap over said tape to prevent rupture of said tape during shipment, said cover having a tab thereon for manual removal of said cover at the dispensing point, a tube of a size to be inserted through said tape and into said aperture for transfer of bees from the housing into a bee observation device or the like without escape of the bees, a wire-mesh like housing secured in said first-mentioned housing for maintaining the queen bee separate from the worker bees during shipment of the bees, and means to open the last-mentioned housing from outside of the first-mentioned housing for transferring all of the bees through said tube.

2. Apparatus as defined in claim 1 wherein said last-mentioned housing is in the form of a tubular member open at one end and closed at its opposite end, said open end being wedged into a mating recess in the cap member during shipment to secure said last-mentioned housing in the first-mentioned housing and prevent intermingling of the queen and worker bees, and wherein said means to open the last-mentioned housing comprises a wire secured to the respective housing and extending through the screen in the end of the first-mentioned housing opposite the cap member for pulling the last-mentioned housing away from the cap member.

References Cited in the file of this patent

UNITED STATES PATENTS

| | | |
|---|---|---|
| 372,233 | Northrop | Oct. 25, 1887 |
| 437,123 | Lacy | Sept. 23, 1890 |
| 1,353,137 | Ault | Sept. 21, 1920 |
| 1,482,468 | Hershiser | Feb. 5, 1924 |
| 1,556,254 | Short | Oct. 6, 1925 |
| 2,170,210 | O'Briene | Aug. 22, 1939 |
| 2,326,250 | O'Briene | Aug. 10, 1943 |